US008918650B2

(12) United States Patent
Dolgunov et al.

(10) Patent No.: US 8,918,650 B2
(45) Date of Patent: Dec. 23, 2014

(54) SECURE DATA PROCESSING FOR UNALIGNED DATA

(75) Inventors: Boris Dolgunov, Ramat Gan (IL); Leonid Minz, Beersheba (IL); Roy Krotman, Rishon Lezion (IL)

(73) Assignee: SanDisk IL Ltd., Kfar Saba (IL)

( * ) Notice: Subject to any disclaimer, the term of this patent is extended or adjusted under 35 U.S.C. 154(b) by 639 days.

(21) Appl. No.: 12/258,626

(22) Filed: Oct. 27, 2008

(65) Prior Publication Data

US 2009/0113218 A1    Apr. 30, 2009

(30) Foreign Application Priority Data

Oct. 30, 2007    (IL) .......................................... 187038

(51) Int. Cl.
| G06F 21/00 | (2013.01) |
| G06F 13/28 | (2006.01) |
| G06F 21/72 | (2013.01) |
| G06F 21/60 | (2013.01) |
| H04L 9/06  | (2006.01) |

(52) U.S. Cl.
CPC ............... *G06F 13/28* (2013.01); *G06F 21/72* (2013.01); *H04L 9/0618* (2013.01); *G06F 21/602* (2013.01)
USPC ................ 713/189; 380/37; 710/22; 711/201

(58) Field of Classification Search
CPC ............................... H04L 9/0618; G06F 21/72
USPC ................ 380/36, 37, 28; 713/189, 193, 194; 710/22; 711/115, 201
See application file for complete search history.

(56) References Cited

U.S. PATENT DOCUMENTS

| 5,168,561 | A  | * | 12/1992 | Vo ..................................... 710/22 |
| 5,802,556 | A  | * | 9/1998  | Patel et al. ..................... 711/109 |
| 5,930,359 | A  | * | 7/1999  | Kempke et al. ............... 713/160 |
| 6,279,044 | B1 | * | 8/2001  | Niu et al. ........................... 710/5 |
| 6,330,631 | B1 |   | 12/2001 | Crosland et al. |
| 6,401,142 | B1 | * | 6/2002  | Williams et al. ................ 710/14 |
| 6,799,232 | B1 | * | 9/2004  | Wang ............................... 710/65 |
| 7,191,341 | B2 | * | 3/2007  | Paaske et al. .................. 713/189 |
| 7,266,703 | B2 | * | 9/2007  | Anand et al. ................... 713/189 |
| 7,360,076 | B2 | * | 4/2008  | Anand et al. ................... 713/151 |
| 7,392,399 | B2 | * | 6/2008  | Grohoski et al. .............. 713/189 |
| 7,403,615 | B2 | * | 7/2008  | Matthews, Jr. ................. 380/42 |
| 7,434,043 | B2 | * | 10/2008 | Buer et al. ..................... 713/153 |
| 7,478,235 | B2 | * | 1/2009  | England et al. ................ 713/153 |
| 7,568,110 | B2 | * | 7/2009  | Buer et al. ..................... 713/189 |
| 7,634,650 | B1 | * | 12/2009 | Shah et al. ..................... 713/150 |

(Continued)

OTHER PUBLICATIONS

Su, Chih-Pin; Wang, Chen-Hsing; Cheng, Kuo-Liang; Huang, Chih-Tsun; Wu, Cheng-Wen; "Design and Test of a Scalable Security Processor", Proceedings of the Asia and South Pacific Design Automation Conference, Jan. 18-21, 2005, vol. 1, pp. 372-375.*

(Continued)

*Primary Examiner* — Victor Lesniewski
(74) *Attorney, Agent, or Firm* — Brinks Gilson & Lione

(57) ABSTRACT

A method for data cryptography includes accepting input data, which contains a section that is to undergo a cryptographic operation and starts at an offset with respect to a beginning of the input data, by a Direct Memory Access (DMA) module. The input data is aligned by the DMA module to cancel out the offset. The aligned input data is read out of the DMA module, and the cryptographic operation is performed on the section.

13 Claims, 4 Drawing Sheets

(56) References Cited

U.S. PATENT DOCUMENTS

| | | | |
|---|---|---|---|
| 7,665,016 B2* | 2/2010 | Behrens et al. | 715/237 |
| 7,681,046 B1* | 3/2010 | Morgan et al. | 713/193 |
| 7,685,436 B2* | 3/2010 | Davis et al. | 713/192 |
| 7,716,577 B2* | 5/2010 | Behrens et al. | 715/237 |
| 7,733,878 B2* | 6/2010 | Knight et al. | 370/395.7 |
| 7,835,391 B2* | 11/2010 | Chateau et al. | 370/466 |
| 7,865,733 B2* | 1/2011 | Goto et al. | 713/176 |
| 7,958,255 B1* | 6/2011 | Karighattam et al. | 709/232 |
| 8,392,824 B2* | 3/2013 | Behrens et al. | 715/237 |
| 8,468,364 B2* | 6/2013 | Goto | 713/187 |
| 2002/0073324 A1* | 6/2002 | Hsu et al. | 713/189 |
| 2003/0084309 A1* | 5/2003 | Kohn | 713/189 |
| 2004/0107340 A1 | 6/2004 | Wann et al. | |
| 2004/0123120 A1* | 6/2004 | Buer et al. | 713/189 |
| 2004/0123123 A1* | 6/2004 | Buer et al. | 713/189 |
| 2005/0132244 A1* | 6/2005 | Milway | 713/400 |
| 2005/0259823 A1 | 11/2005 | Apostol, Jr. et al. | |
| 2005/0289253 A1 | 12/2005 | Edirisooriya et al. | |
| 2006/0021022 A1 | 1/2006 | Krishna et al. | |
| 2006/0177064 A1 | 8/2006 | Holtzman et al. | |
| 2007/0140477 A1* | 6/2007 | Wise | 380/28 |
| 2007/0180539 A1 | 8/2007 | Holtzman et al. | |
| 2008/0114937 A1* | 5/2008 | Reid et al. | 711/117 |
| 2008/0195781 A1 | 8/2008 | Kim et al. | |
| 2009/0259857 A1* | 10/2009 | Gehrmann | 713/193 |

OTHER PUBLICATIONS

Crowe, Francis; Daly, Alan; Kerins, Tim; Marnane, William; "Single-Chip FPGA Implementation of a Cryptographic Co-Processor", IEEE International Conference on Field-Programmable Technology, Dec. 6-8, 2004, pp. 279-285.*

Su, Chih-Pin; Wang, Chen-Hsing; Cheng, Kuo-Liang; Huang, Chih-Tsun; Wu, Cheng-Wen; "Design and Test of a Scalable Security Processor", Asia and South Pacific Design Automation Conference, Jan. 18-21, 2005, vol. 1, pp. 372-375.*

International Search Report and Written Opinion for PCT/IL2008/001384, dated Feb. 23, 2009, 12 pages.

International Preliminary Report on Patentability for PCT/IL2008/001384, dated May 14, 2010, 7 pages.

* cited by examiner

FIG. 1B
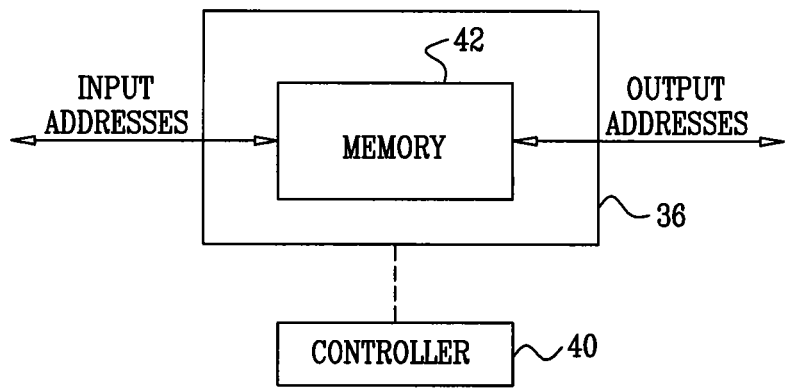
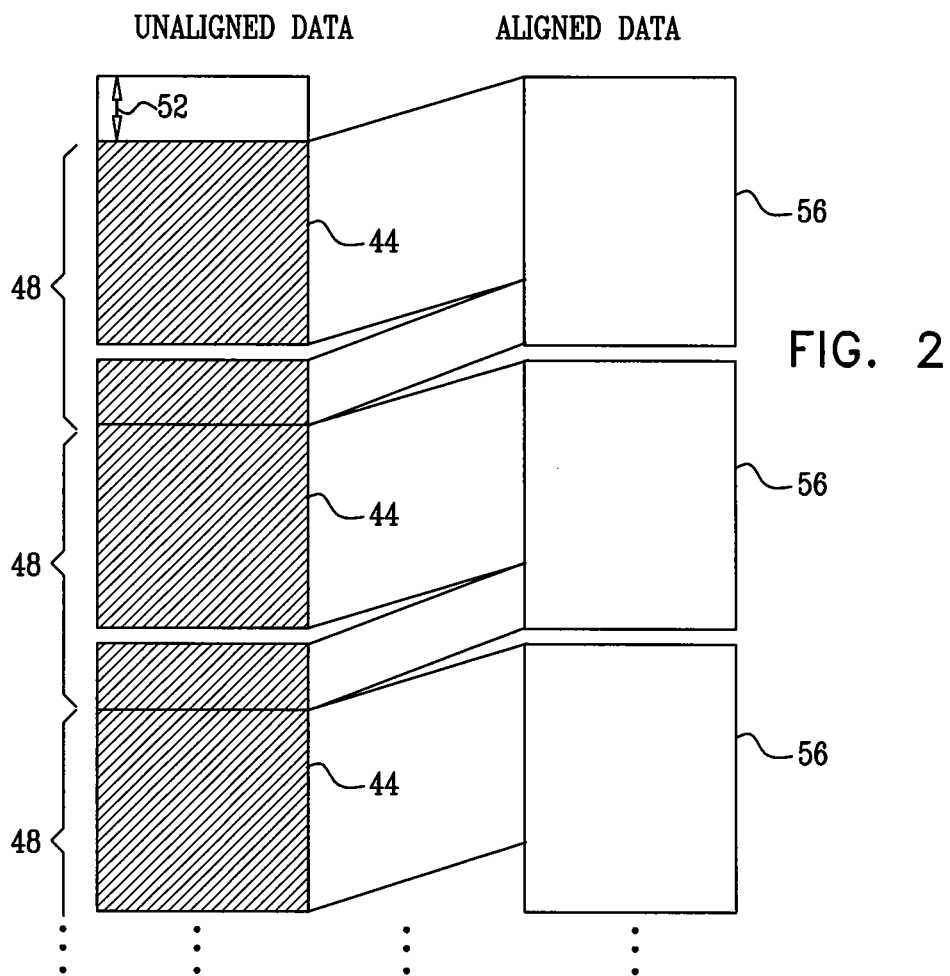
FIG. 2

US 8,918,650 B2

SECURE DATA PROCESSING FOR UNALIGNED DATA

FIELD OF THE INVENTION

The present invention relates generally to cryptography, and particularly to methods and systems for aligning data undergoing cryptographic operations.

BACKGROUND OF THE INVENTION

Several methods and systems for data alignment are known in the art. One exemplary bus bridge uses a shift and accumulate unit for bridging between buses, so as to enable a desired amount of shift to be combined with the accumulation of selected bits or bytes, and to realign sets of bytes from one bus and to form sets of bytes for the other bus.

SUMMARY OF THE INVENTION

Embodiments of the present invention provide a cryptography apparatus, including:

a Direct Memory Access (DMA) module, which is configured to accept input data containing a section that is to undergo a cryptographic operation and starts at an offset with respect to a beginning of the input data, and to align the input data so as to cancel out the offset; and a cryptography module, which is configured to read the aligned input data out of the DMA module and to perform the cryptographic operation on the section.

In some embodiments, the DMA module includes a memory buffer, the input data is written to a first set of addresses of the memory buffer, the DMA module is configured to copy the section to a second set of the addresses of the memory buffer, and the cryptography module is configured to read the section from the second set of the addresses of the memory buffer. In an embodiment, the first set of the addresses overlaps the second set of the addresses in the memory buffer, and the DMA module is configured to overwrite at least some of the input data written to the first set of the addresses when copying the section to the second set of the addresses.

In another embodiment, the input data is partitioned into data blocks, the section is contained in two or more of the data blocks, and the DMA module is configured to read the section out of the two or more of the data blocks so as to provide the section consecutively to the cryptography module. In yet another embodiment, the cryptography module includes at least first and second cryptography cores cascaded in a pipeline, and the first cryptography core is connected to the DMA module. In still another embodiment, the cryptographic operation includes at least one operation type selected from a group of types consisting of encryption, decryption, electronic signing and signature verification.

The cryptography module may apply at least one cryptographic process selected from a group of processes consisting of an Advanced Encryption Standard (AES) process, a Data Encryption Standard (DES) process, a Secure Hash Algorithm 1 (SHA1) process, a SHA2 process, a Message Digest 5 (MD5) process and a Rivest Cipher 5 (RC5) process.

In a disclosed embodiment, the apparatus includes another DMA module, which is configured to accept an output of the cryptographic operation from the cryptography module and to re-introduce the offset into the output. In some embodiments, the cryptography module produces output data, and the apparatus includes a memory, which is configured to store the output data. In an embodiment, the input data includes multiple parallel data streams. The apparatus may include a controller, which is configured to notify the DMA module of the offset so as to enable the DMA module to align the input data. The controller and DMA module may be configured to modify the offset during operation.

In another embodiment, the input data includes input data words having a size, and the offset is not an integer multiple of the size. The DMA module sometimes includes an internal register that holds a fragment of the input data, and is configured to align the input data by performing shift operations on the fragment.

There is additionally provided, in accordance with an embodiment of the present invention, a method for cryptography, including:

accepting input data, which contains a section that is to undergo a cryptographic operation and starts at an offset with respect to a beginning of the input data, by a Direct Memory Access (DMA) module;

aligning the input data by the DMA module to cancel out the offset;

reading the aligned input data out of the DMA module; and performing the cryptographic operation on the section.

There is also provided, in accordance with an embodiment of the present invention, a storage device, including:

a Direct Memory Access (DMA) module, which is configured to accept input data containing a section that is to undergo a cryptographic operation and starts at an offset with respect to a beginning of the input data, and to align the input data so as to cancel out the offset;

a cryptography module, which is configured to read the aligned input data out of the DMA module and to perform the cryptographic operation on the section to produce output data; and a memory, which is configured to store the output data.

There is further provided, in accordance with an embodiment of the present invention, a data storage method, including:

accepting input data, which contains a section that is to undergo a cryptographic operation and starts at an offset with respect to a beginning of the input data, by a Direct Memory Access (DMA) module;

aligning the input data by the DMA module to cancel out the offset;

reading the aligned input data out of the DMA module;

performing the cryptographic operation on the section to produce output data; and storing the output data in a memory.

The present invention will be more fully understood from the following detailed description of the embodiments thereof, taken together with the drawings in which:

BRIEF DESCRIPTION OF THE DRAWINGS

FIG. 1B is a block diagram that schematically illustrates a Direct Memory Access (DMA) module, in accordance with an embodiment of the present invention;

FIG. 2 is a diagram that schematically illustrates a data alignment operation, in accordance with an embodiment of the present invention;

DETAILED DESCRIPTION OF EMBODIMENTS

Overview

Figure 1A:
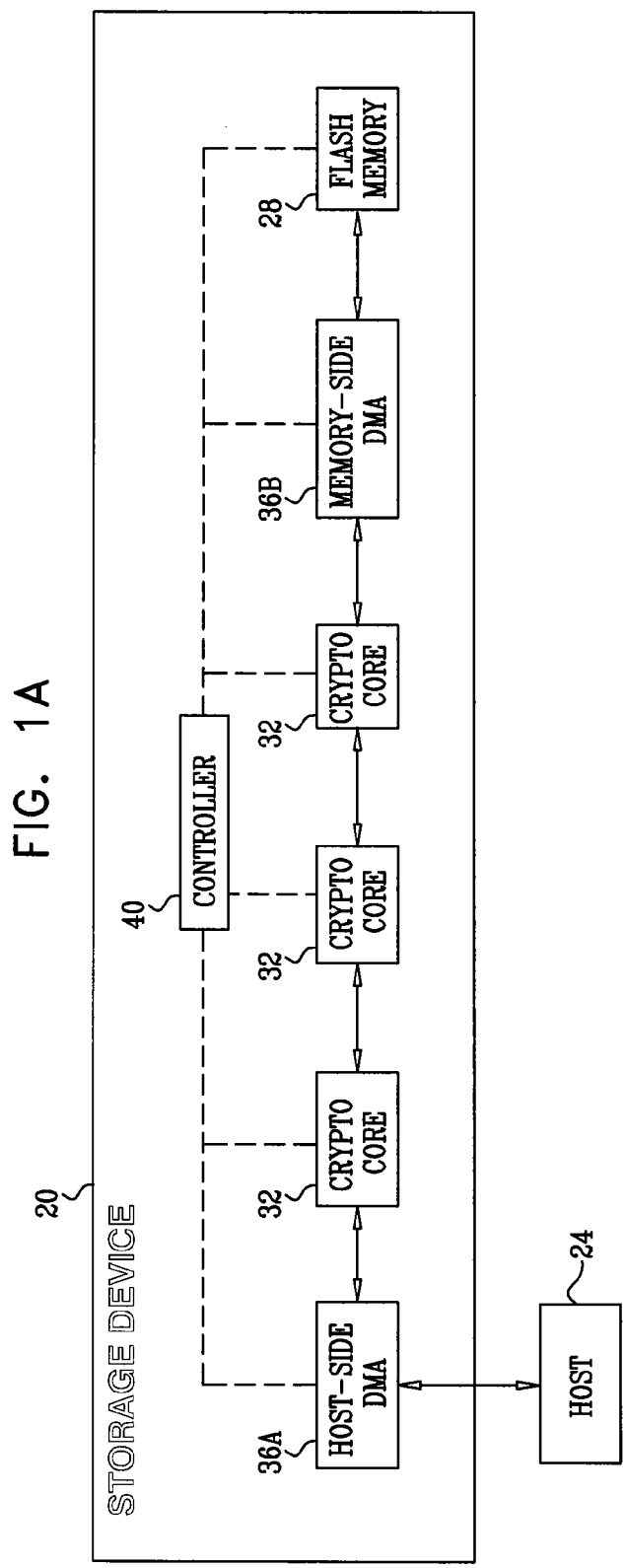
FIG. 1A is a block diagram that schematically illustrates a storage device, in accordance with an embodiment of the present invention.

Cryptography methods are used in a variety of systems and applications. For example, storage devices sometimes encrypt and/or apply electronic signatures to the stored data, as well as to the data exchanged with external hosts.

Typically, hardware circuits that carry out cryptographic operations in storage devices process the data in fixed-size blocks and assume that the data is aligned with these blocks. In addition, memory components used in storage devices often store data in fixed-size blocks, referred to herein as sectors. Moreover, memory access, bus transfer and other operations performed in storage devices are often carried out at a certain granularity, e.g., 32-bit.

In practice, however, input data that is provided for storage is often unaligned. For example, some data transfer standards have variable-length header fields, which cause the data content (which is the object of the cryptographic operations) to have an arbitrary offset with respect to the beginning of the input data. Thus, in many practical scenarios, the data provided to the storage device cannot be assumed to be aligned with the cryptography block size, memory sector size or data access granularity that is used.

Embodiments of the present invention provide improved methods and systems for data alignment, which mediate between the unaligned nature of the input data and the aligned nature of the cryptography and storage operations. In some embodiments that are described hereinbelow, a storage device comprises a memory and a cryptography module, which applies a cryptographic operation to the data written to and read from the memory. The cryptography module assumes that the data is aligned.

The storage device comprises a Direct Memory Access (DMA) module, which accepts unaligned input data and passes it to the cryptography module. The input data is read by the DMA module using a first set of addresses. The DMA module copies the input data to a second set of addresses, which is aligned with the cryptography blocks. The cryptography module reads the aligned input data out of the DMA module and performs the cryptographic operation on the desired section. In some embodiments, the DMA module copies the input data from the first set to the second set of addresses in-place, i.e., in the same memory buffer, thus reducing the memory size required.

In some embodiments, the storage device comprises a second DMA module, which is connected between the cryptography module and the memory device. The second DMA module aligns data sent for storage with the sectors of the memory, and aligns data retrieved from memory with the cryptography blocks.

The methods and systems described herein enable storage devices to apply cryptographic operations at a fast rate and with a minimal increase in hardware complexity, in comparison with systems that accept only aligned data. The DMA modules described herein may be implemented using a small number of logic gates or cells, and contribute only a small increase to the size and power consumption of the storage device.

In a typical application, the cryptography module comprises two or more cryptography cores, which are arranged in a pipeline. In such applications, one of the DMA modules is connected at each end of the pipeline, so that the pipeline as a whole accepts and processes aligned data. Thus, data alignment need not be performed in each individual core. The DMA modules cause only a small increase in pipeline latency, which is usually tolerable.

System Description

FIG. 1A is a block diagram that schematically illustrates a storage device 20, in accordance with an embodiment of the present invention. Device 20 typically comprises a removable storage device such as a Disk-on-Key, memory card or smart-card, but may generally comprise any other suitable device type. Device 20 communicates with a host 24, which may comprise, for example, a computing device, a digital camera, a mobile phone, or any other suitable host system that stores data. Host 24 sends data for storage to device 20, and retrieves data that is stored in the storage device. Storage device 20 comprises a memory 28, in the present example comprising a Flash memory. In alternative embodiments, however, memory 28 may comprise any other suitable type of volatile or non-volatile memory.

Device 20 comprises one or more cryptography modules 32, which carry out cryptographic operations on data that is written into and read out of memory 28, as well as on data that is exchanged with host 24. For example, modules 32 may apply operations such as data encryption, decryption, electronic signing and/or signature verification. Modules 32 may apply any suitable cryptography algorithm, such as, for example, Advanced Encryption Standard (AES), Data Encryption Standard (DES), Secure Hash Algorithm 1 (SHA1), SHA2, Message Digest 5 (MD5), Rivest Cipher 5 (RC5), and/or any other suitable cryptographic process, for carrying out cryptographic operations.

In some embodiments, multiple cryptography cores are connected in a pipeline, such that each core processes the output of the preceding core in the pipeline. For example, a certain core may perform decryption and another core may perform signature verification. The pipeline architecture enables splitting the cryptographic operations among multiple cores while minimizing processing latency. In the present example, device 20 comprises three cryptography cores 32 arranged in a pipeline. Cores 32 apply cryptographic operations both to data sent by host 24 for storage in memory 28, and to data read from memory 28 that is to be sent to host 24.

Cryptography cores 32 apply the cryptographic operations to blocks of data having a particular size. A typical cryptography block size is on the order of 8 to 128 bytes, although other values can also be used. Each core assumes that the data at its input is partitioned into consecutive blocks having the desired size, and that the data is aligned with the blocks. In other words, each core assumes that there is no offset from the beginning of the input data to the beginning of the part of the data that should undergo the cryptographic operation.

Additionally, memory 28 typically stores and retrieves data in fixed-size blocks of data referred to as sectors. A typical sector size is 512 bytes, although other values can also be used. Moreover, memory devices, memory access buses and associated hardware typically access data at 32-bit (four byte) granularity, and have difficulties accessing data that is not aligned to an integer multiple of four bytes.

In practice, however, the data that is provided to device 20 is sometimes unaligned. For example, some data transfer standards specify file formats having variable-length header fields. In such cases, the location of the data, to which the cryptographic operations are to be applied, may have a varying offset with respect to the beginning of the file. Variable-length headers are defined, for example, in multimedia standards such as the Delivery Content Format (DCF) specified in the Open Mobile Alliance (OMA) Digital Rights Management (DRM) standards. Other scenarios in which the input data is unaligned are encountered, for example, in the processing of certificates and certificate chains.

In summary, the data provided to device 20 cannot be assumed to be aligned with the cryptography block size, memory sector size or bus data width used.

In order to mediate between the unaligned data provided to device 20 and the aligned operation of cores 32, memory 28 and their peripheral hardware, device 20 aligns the data using one or more Direct Memory Access (DMA) modules. In the present example, device 20 comprises a host-side DMA module 36A, which mediates between the host and the cryptography cores, and a memory-side DMA module 36B, which mediates between the cryptography cores and the memory. The DMA modules accept unaligned data and produce data that is aligned to a specified block size, and vice versa. The operation of the DMA modules is described in greater detail below. Device 20 further comprises a controller 40, which controls the DMA modules and cryptography cores.

DMA modules 36A and 36B and cryptography cores 32 are typically implemented in hardware, such as in one or more Application-Specific Integrated Circuits (ASICs) or Field-Programmable Gate Arrays (FPGAs). Controller 40 may be implemented in hardware or firmware, and/or using software running on a suitable processor. In some embodiments, cores 32, or certain functions thereof, can also be implemented in software.

The storage device configuration of FIG. 1A is an exemplary configuration, which is chosen purely for the sake of conceptual clarity. Any other suitable configuration can also be used. For example, device 20 may comprise any desired number of cryptography cores, or only a single core. The cores may be arranged in a pipeline or in any other suitable configuration. In some embodiments, a single DMA circuit may carry out the functions of both host-side and memory-side DMA modules.

FIG. 1B is a block diagram that schematically illustrates DMA module 36A or 36B, in accordance with an embodiment of the present invention. The DMA module comprises a memory buffer 42, which may be accessed simultaneously by two entities (e.g., by the host and cryptography core in the case of module 36A, or by the cryptography core and Flash memory in the case of module 36B).

Data is accepted by the DMA module using a first set of addresses, and the DMA module copies the data to a second set of addresses, thereby shifting the data by a controlled amount. The shifted data can be read out of the DMA module using the second set of addresses. (The addresses are denoted "input addresses" and "output addresses" in the figure. However, since the DMA modules operate bidirectionally, the input and output roles alternate, and both address sets are used for both input and output.) The addresses in each set and the offset between them (i.e., the amount of shift) are configured by controller 40.

For example, in order to align input data, the data is written to memory buffer 42 of DMA module 36A using the first set of addresses. The DMA module copies the data to the second set of addresses, which is aligned with the cryptography blocks of cryptography cores 32. Thus, the section of the data that is intended to undergo the cryptography operations begins at the beginning of the second set of addresses. The left-most cryptography core of FIG. 1A above reads the data out of module 36A using the second set of addresses, and therefore accepts aligned data.

In some embodiments, the DMA module copies the input data from the first set to the second set of addresses in-place. In other words, if the first and second sets overlap, some of the copied input data will overwrite the data that was previously written in the overlapping addresses.

DMA Data Alignment Operations

In a typical data storage operation, input data is provided from host 24 to device 20 and is accepted by host-side DMA module 36A. The input data is unaligned, i.e., the section of the data that should be encrypted, decrypted, signed and/or verified is positioned at a certain offset with respect to the beginning of the input data. DMA module 36A aligns the data with the cryptography blocks used by cores 32. In other words, the left-most cryptography core in FIG. 1A reads from module 36A data, which is aligned so that the desired section of the data has no offset with respect to the beginning of the cryptography block size. Cores 32 process the aligned data, and the right-most core in the pipeline writes the processed data to memory-side DMA module 36B. Module 36B re-aligns the data to match the sectors of memory 28, and provides the data to the memory.

In a typical data retrieval operation, the memory-side DMA module reads the retrieved data (which is aligned with the memory sector size) from memory 28 and aligns it with the blocks of the cryptography cores. The cores process the data and provide it to host-side DMA module 36A. The host-side DMA module optionally introduces an offset to the aligned data and outputs the data to the host.

For example, a data item sent to the memory for storage may comprise a header, which should not be encrypted, and a body, which should be encrypted. When retrieving the data item and sending it to the host, the host-side DMA module re-introduces the original offset of the body with respect to the beginning of the data item, in order to re-assemble the decrypted body and the header.

In some embodiments, when one of the DMA modules performs data alignment, the other DMA module may de-align the data (after processing by the cryptography cores) to the original unaligned position.

FIG. 2 is a diagram that schematically illustrates the data alignment operations carried out by DMA modules 36A and 36B of FIG. 1A above, in accordance with an embodiment of the present invention.

Consider, for example, the data alignment operation performed by host-side module 36A when accepting data for storage. In the present example, input data is provided by host 24 to module 36A in blocks 44. The data blocks contain blocks 48 of data that should undergo a cryptographic operation. However, the section of the data that is intended to undergo the cryptographic operation is positioned at an offset 52 with respect to the beginning of the data.

DMA module 36A copies the input data to form blocks 56, whose size is the cryptography block size. Thus, the data in blocks 56 is aligned with the cryptography blocks and can be readily processed by cores 32.

As noted above, module 36A copies the input data from certain source addresses (which represent the data locations in blocks 44) to certain destination addresses (which represent the data locations in blocks 56). Note that in some cases the data in a certain block 56 originates from two different blocks 44. In such cases, the source address for a particular block 56 may change along the block.

Other data alignment operations, e.g., the alignment performed by module 36B from sector-aligned data read from memory 28 to cryptography-block-aligned data, is carried out in a similar fashion. When the memory access but has a certain granularity, e.g., 32-bits, the memory-side DMA module can exchange 32-bit aligned data with the memory, and align it with the desired cryptography block size.

The translation of source addresses to destination addresses performed by modules 36A and 36B depends on the value of offset 52, as well as on the sizes of blocks 44 and 56. Typically, the DMA modules are configurable, i.e., they can be configured to match different offsets and block sizes. In some embodiments, controller 40 configures the DMA modules per the desired offset and/or block sizes. The offset and/or block size values may sometimes be changed during operation of the storage device.

Figure 3:
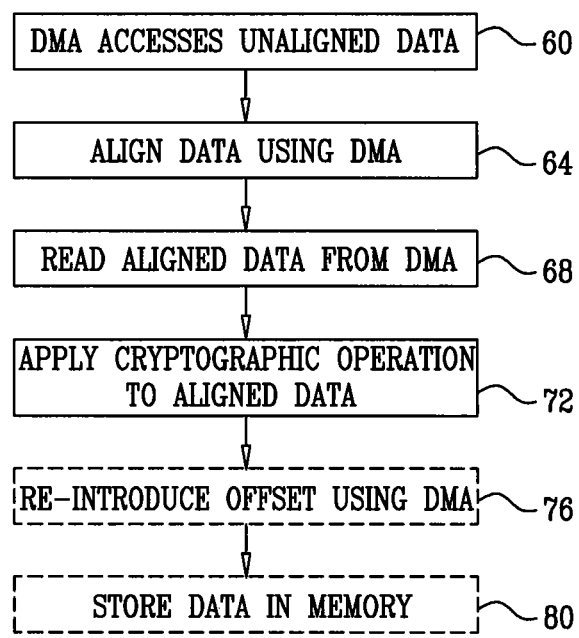
FIG. 3 is a flow chart that schematically illustrates a method for performing a cryptographic operation on unaligned data, in accordance with an embodiment of the present invention.

FIG. 3 is a flow chart that schematically illustrates a method for performing a cryptographic operation on unaligned data, in accordance with an embodiment of the present invention. The method description refers both to unaligned data that is sent by host 24 (in which case the operation is performed by module 36A) and to data that is read from memory 28 and is unaligned with the cryptography blocks (in which case the operation is performed by module 36B).

The method begins with the DMA module accepting the unaligned data, at an unaligned input step 60. The DMA module copies the unaligned data from a set of unaligned source addresses to a set of aligned destination addresses, at an alignment step 64. The cryptography core that is connected to the DMA module reads the aligned data, at an aligned reading step 68. The cryptography cores apply one or more cryptographic operations to the aligned data, at a cryptographic operation step 72.

In some embodiments, e.g., when the alignment is performed on data that is read from memory and is to be sent to the host, the opposite DMA module may re-introduce an offset (typically the original offset) to the data, at an offset insertion step 76. In the opposite direction, i.e., when writing data to the storage device, the memory-side DMA module may re-align the data with the sectors of memory 28. The memory-side DMA module then writes the data to the memory, at a storage step 80.

In some cases, the host runs multiple applications that involve storage and/or retrieval of data in storage device 20. Each application may access the storage device independently. Thus, the input data provided to device 20 may comprise multiple data streams, corresponding to the multiple applications. Different data streams may have different alignment offsets.

Figure 4:
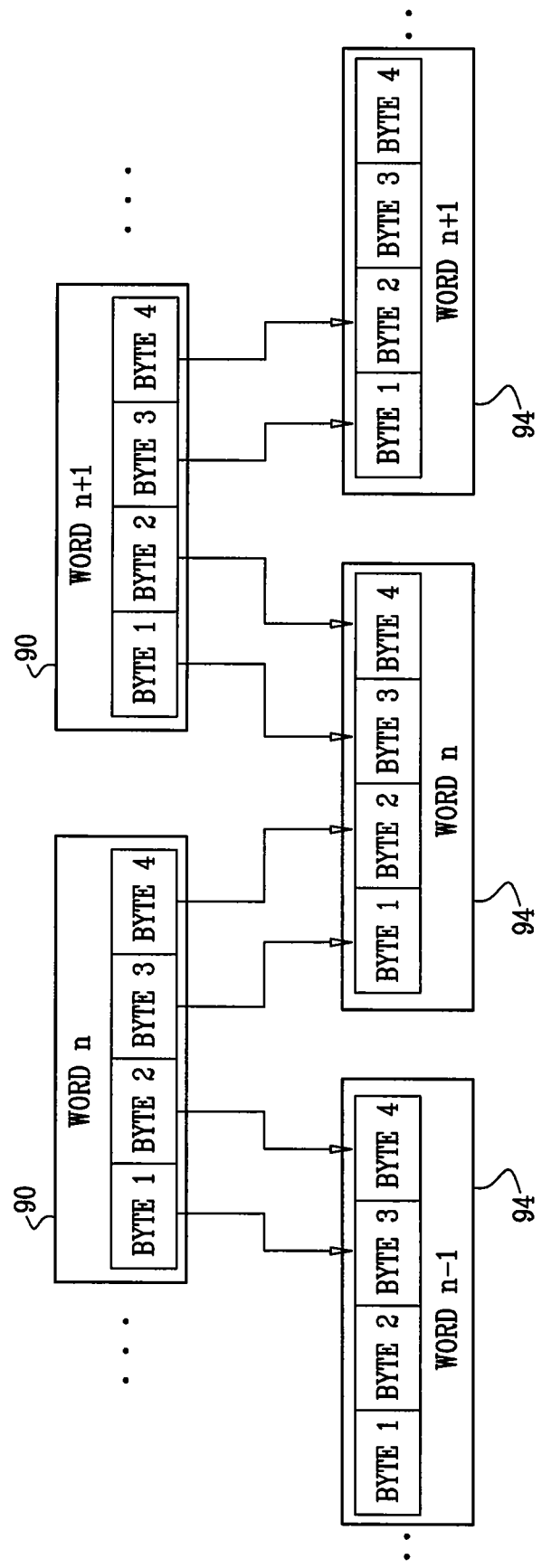
FIG. 4 is a diagram that schematically illustrates in-place operation of a DMA module, in accordance with an embodiment of the present invention.

FIG. 4 is a diagram that schematically illustrates in-place operation of DMA module 36A or 36B, in accordance with an embodiment of the present invention. The exemplary DMA module of FIG. 4 has 32-bit access, which matches the typical bus width that is often used in storage devices and various other embedded systems. The input data is accepted by the DMA module using the first set of addresses as 32-bit input data words 90. Each word comprises four bytes, denoted BYTE1 . . . BYTE4. The DMA module copies the data to produce 32-bit output data words 94.

The DMA module is able to shift the input data at a resolution of one byte, a resolution that is smaller than the size of the four-byte input and output data words. In the example shown in FIG. 4, the input data is shifted by two bytes. Since the shift (the offset) is not necessarily an integer multiple of four bytes, the data in a given input data word may be split between two consecutive output data words.

In order to copy the input data at a single-byte resolution, the DMA module maintains an internal state, e.g., an internal register, which holds a fragment of the input data. In the present example, the state comprises a single 32-bit word. The DMA performs the appropriate shift operations on the fragment cached in the internal state to combine two parts of subsequent input data words 90 to produce output data words 94. Thus, the DMA module of FIG. 4 reads and writes four bytes of data in each clock cycle. This mechanism enables the DMA modules described herein to provide single-byte shift resolution, while exploiting the full throughput of their 32-bit input and output interfaces. This feature is in contrast to some known DMA circuits, which either copy entire 32-bit words (and therefore cannot provide a resolution that is finer than four bytes) or copy a single byte at a time (which considerably reduces their throughput).

The mechanism of FIG. 4 can be used both in DMA configurations that copy the input data in-place, and in configurations that use separate memory areas for the input and output data words.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for cryptography, the method comprising:
accepting input data with a first Direct Memory Access (DMA) module, the input data comprising a section that is to undergo a cryptographic operation and that starts at an offset with respect to a beginning of the input data;
receiving, with the first DMA module, a notification of where the section that is to undergo the cryptographic operation starts with respect to the beginning of the input data so as to enable the first DMA module to align the input data;
aligning, with the first DMA module, based on the received notification, the input data to cancel out the offset, wherein aligning the input data comprises forming one or more data blocks where at least one of the data blocks comprises data that was received at the first DMA module in two different data blocks;
reading, with a cryptography module that is distinct from the first DMA module, the aligned input data out of the first DMA module; and
performing, with the cryptography module, the cryptographic operation on the section of the aligned input data;
accepting, with a second DMA module that is distinct from the first DMA module, an output of the cryptography module from the cryptography module; and
re-introducing, with the second DMA module, the offset into the output of the cryptographic operation;
wherein performing the cryptographic operation comprises performing the operation by at least first and second cryptography cores cascaded in a pipeline, the first cryptography core configured to perform decryption of the section of aligned input data and the second cryptography core configured to perform signature verification of the section of the aligned input data.

2. The method according to claim 1, wherein accepting the input data comprises accepting the input data written to a first set of addresses, wherein aligning the input data comprises copying the section to a second set of addresses, and wherein reading the aligned input data comprises reading the section from the second set of addresses.

3. The method according to claim 2, wherein the first set of addresses overlaps the second set of addresses in a memory buffer, and wherein copying the section to the second set of the addresses comprises overwriting at least some of the input data written to the first set of addresses.

4. The method according to claim 1, wherein the input data is partitioned into data blocks and the section is contained in two or more of the data blocks, and wherein aligning the input data comprises reading the section out of the two or more of the data blocks so as to provide the section consecutively to the cryptography module.

5. The method according to claim 1, further comprising:
storing an output of the cryptographic operation in a memory.

6. The method according to claim 1, wherein accepting the input data comprises caching a fragment of the input data, and wherein aligning the input data comprises performing shift operations on the fragment.

7. An apparatus comprising:
a first Direct Memory Access (DMA) module configured to:
accept input data that comprises a section that is to undergo a cryptographic operation and that starts with an offset with respect to a beginning of the input data;
receive a notification of where the section that is to undergo the cryptographic operation starts with respect to the beginning of the input data; and
align, based on the received notification, the input data to cancel out the offset, wherein to align the input data, the first DMA module is configured to form one or more data blocks where at least one of the data blocks comprises data that was received at the first DMA module in two different data blocks; and
a cryptography module in communication with the DMA module, the cryptography module comprising first and second cryptographic cores cascaded in a pipeline, the cryptography module configured to:
read the aligned input data out of the DMA module; and
perform a cryptographic operation on the section of the aligned input data using the first and second cryptographic cores, the first cryptography core configured to perform decryption of the section of the aligned input data and the second cryptography core configured to perform signature verification of the section of the aligned input data;
a second DMA module that is distinct from the first DMA module, the second DMA module configured to:
accept an output of the cryptography module from the cryptography module; and
re-introduce the offset into the output of cryptographic operation.

8. The apparatus of claim 7, wherein to accept the input data, the first DMA module is configured to accept input data written to a first set of addresses, wherein to align the input data, the first DMA module is configured to copy the section to a second set of addresses, and wherein to read the aligned input data, the cryptographic module is configured to read the section from the second set of addresses.

9. The apparatus of claim 8, wherein the apparatus further comprises a memory buffer and the first set of addresses overlaps the second set of addresses in the memory buffer, and wherein to copy the section to the second set of the addresses, the first DMA module is configured to overwrite at least some of the input data written to the first set of addresses.

10. The apparatus of claim 7, wherein the input data is partitioned into data blocks and the section is contained in two or more of the data blocks, and wherein to align the input data, the first DMA module is configured to read the section out of the two or more of the data blocks so as to provide the section consecutively to the cryptography module.

11. The apparatus of claim 7, wherein the apparatus further comprises a memory; and wherein the second DMA module is further configured to store an output of the cryptographic operation in the memory.

12. The apparatus of claim 7, wherein to accept the input data, the first DMA module is configured to cache a fragment of the input data; and wherein to align the input data, the first DMA module is configured to perform shift operations on the fragment.

13. An apparatus comprising:
a Direct Memory Access (DMA) module configured to:
accept input data that comprises a section that is to undergo a cryptographic operation and that starts with an offset with respect to a beginning of the input data;
receive a notification of where the section that is to undergo the cryptographic operation starts with respect to the beginning of the input data; and
align, based on the received notification, the input data to cancel out the offset, wherein to align the input data, the DMA module is configured to form one or more data blocks where at least one of the data blocks comprises data that was received at the first DMA module in two different data blocks; and
a cryptography module in communication with the DMA module, the cryptography module comprising first and second cryptographic cores cascaded in a pipeline, the cryptography module configured to:
read the aligned input data out of the DMA module; and
perform a cryptographic operation on the section of the aligned input data using the first and second cryptographic cores, wherein the first cryptography core is configured to perform decryption of the section of aligned input data and the second cryptography core is configured to perform signature verification of the section of the aligned input data.

* * * * *